United States Patent [19]
Nakamura et al.

[11] 4,106,037
[45] Aug. 8, 1978

[54] FLASH DEVICE FOR USE WITH A CAMERA

[75] Inventors: Zenzo Nakamura, Urawa; Goro Hasegawa, Fuchu, both of Japan

[73] Assignee: Canon Kabushiki Kaisha, Tokyo, Japan

[21] Appl. No.: 752,174

[22] Filed: Dec. 20, 1976

[30] Foreign Application Priority Data

Dec. 27, 1975 [JP] Japan .................................. 50/177067

[51] Int. Cl.² ........................ G03B 15/03; G03B 17/02
[52] U.S. Cl. .................................... 354/128; 354/145; 354/147; 354/288

[58] Field of Search ............... 240/1.3; 354/27, 32–35, 354/60 F, 126–129, 139, 145, 147, 149, 288, 289, 354; 362/3, 4, 5, 7, 8, 9, 18, 269

[56] References Cited

U.S. PATENT DOCUMENTS

| 2,682,603 | 6/1954 | Pine et al. | 354/145 X |
|---|---|---|---|
| 2,783,696 | 3/1957 | Sewig | 240/1.3 |
| 3,969,737 | 7/1976 | Kendrick | 354/145 X |

*Primary Examiner*—L. T. Hix
*Assistant Examiner*—William B. Perkey
*Attorney, Agent, or Firm*—Toren, McGeady and Stanger

[57] ABSTRACT

A flash unit is mounted in a lens cap which constitutes an indispensable accessory of the camera.

8 Claims, 10 Drawing Figures

FLASH DEVICE FOR USE WITH A CAMERA

BACKGROUND OF THE INVENTION

1. Field of the invention.

The present invention relates to a flash unit for use with a camera.

2. Description of the Prior Art

A flash unit for flash photography is ordinarily constructed as a separate accessory which is mounted on a camera body when needed. Hence a camera user may forget to carry a flash unit with him, and in such case must forego its use. In order to avoid this inconvenience, cameras incorporating flash units therein have been proposed. However, such cameras are necessarily larger than corresponding cameras that have been built as compactly as possible. In fact, cameras with built-in flash units may be quite cumbersome as compared to cameras without such units. Moreover, in manufacture, adapting a camera for built-in flash requires extensive redesign of the camera body to receive the flash unit. Effectively, the project requires an entirely new mechanism.

Generally speaking a compactness in size and light weight are important features in a photographic camera. Various complicated mechanisms and devices are housed in a very compact manner within a camera body. This leaves little extra space therein large enough to receive a flash unit. Thus, housing a comparatively large flash unit a compact camera. Inevitably make the size of camera body large. Also changes in design of various complicated mechanisms and devices built in a camera body and development of a new mechanism are needed to prevent the size of said camera body from becoming too large. This noises the cost of camera solely for housing a flash device in a camera.

Also, when a flash device is housed in a camera body, said flash device will be positioned comparatively close to the camera's objective lens. The angle formed between a line connecting the flash device with an object and the optical axis of the lens is then very small. When the subject is a person, this often produces so-called "red eye." That is, the eyes of a person photographed in a finished color print appear red.

This "red eye" phenomenon occurs while a portion of the light generated by a flash device is reflected by eyes of the subject and back to the taking lens when the angle formed by the line connecting a flash device with an object and the optical axis of the taking lens is small. In other words it appears when the position of the flash device is close to the objective lens.

SUMMARY OF THE INVENTION

The present invention is made in view of the above and it is the primary object of the same eliminate the disadvantages and inconveniences of a conventional flash camera.

Another object of the present invention is to provide a flash system which avoids the inconveniences of a camera user forgetting to carry a flash unit without significant change in the structure of the various mechanisms and devices housed in a camera body, and in compact manner which prevents the size of camera body from becoming large.

Another object of the present invention is, along with said primary object, to provide a flash unit that avoids "red eye".

According to a feature of the present invention a flash unit is mounted in a lens cap which is an indispensable accessory of a camera.

And according to another feature of the present invention a flash device is contained in a lens cap which is movably mounted on a pocket size camera.

Also in another example of the present invention a flash device is contained in a lens cap which is made as attached to and detached from a taking lens and during flash operation said lens cap is mounted on an accessory shoe provided on a 35-mm size still camera. These and other features of the invention are pointed out in the claims.

Other objects and advantages of the present invention will be made apparent from the following description when read in light of the drawings.

BRIEF DESCRIPTION OF THE DRAWINGS

FIGS. 1 to 4 show an example of the present invention applied to a pocket size camera, wherein:

FIG. 1 is a perspective view of a camera in a state wherein a lens cap containing a flash device is moved to a raised position relative to a camera body, FIG. 2 is a perspective exploded view of important parts for mechanical coupling between a camera body and a lens cap in a camera shown in FIG. 1 and the electrical connection therebetween, FIG. 4 is a circuit diagram to show an electric circuit of said flash device contained in the lens cap and an electric circuit provided at a camera body as well as connection between said two electric circuits.

Also FIGS. 5 to 7 show an example of a case when the present invention is applied to a 35-mm size still camera, wherein:

FIG. 5 is a plan view showing a camera wherein a lens cap containing a flash unit is attached to a phototaking lens, FIG. 6A is a side elevation of a lens cap shown in FIG. 5, FIG. 6B is a schematic drawing as B—B portion of FIG. 6A is viewed.

FIG. 6C is a schematic drawing as C—C portion of FIG. 6A is viewed.

FIG. 7 is an oblique view to show the relationship among important parts for mechancial coupling and electrical connection between a camera body and a lens cap in the camera shown in FIG. 5.

DETAILED DESCRIPTION OF THE PREFERRED EMBODIMENTS

First, explanations on the present invention will be made on its application to a pocket size camera referred to FIGS. 1 to 4.

Figure 1:
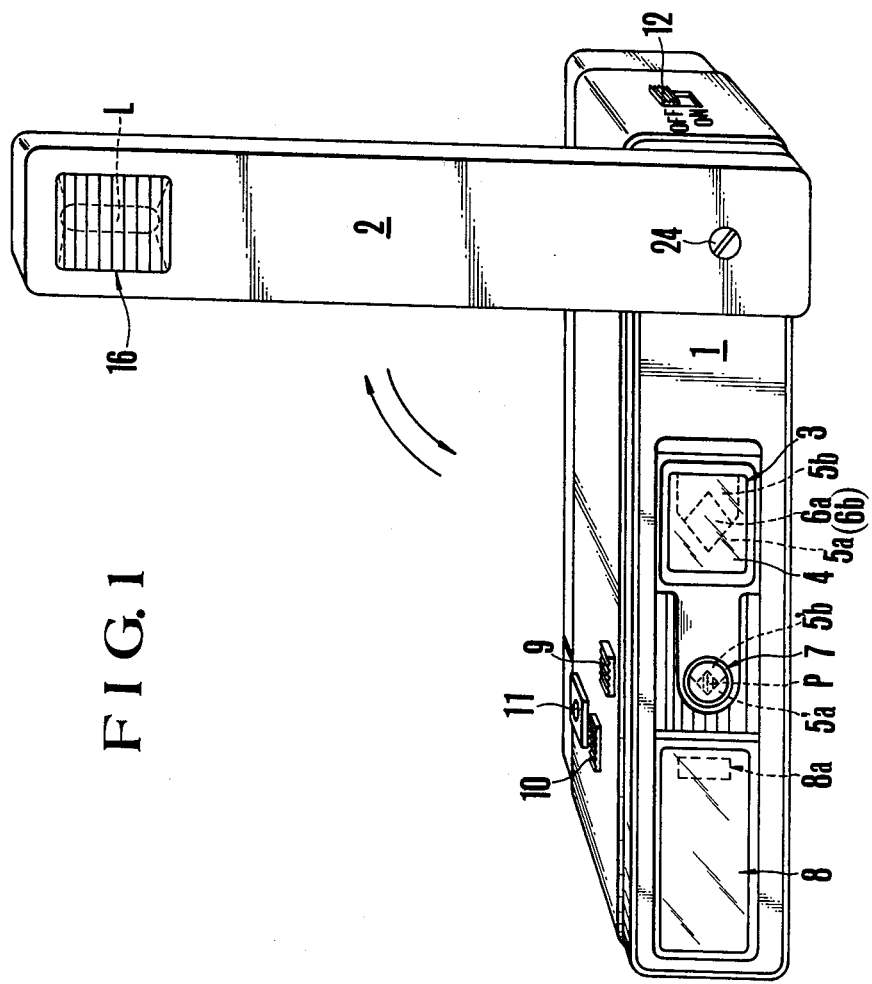
Figure 2:
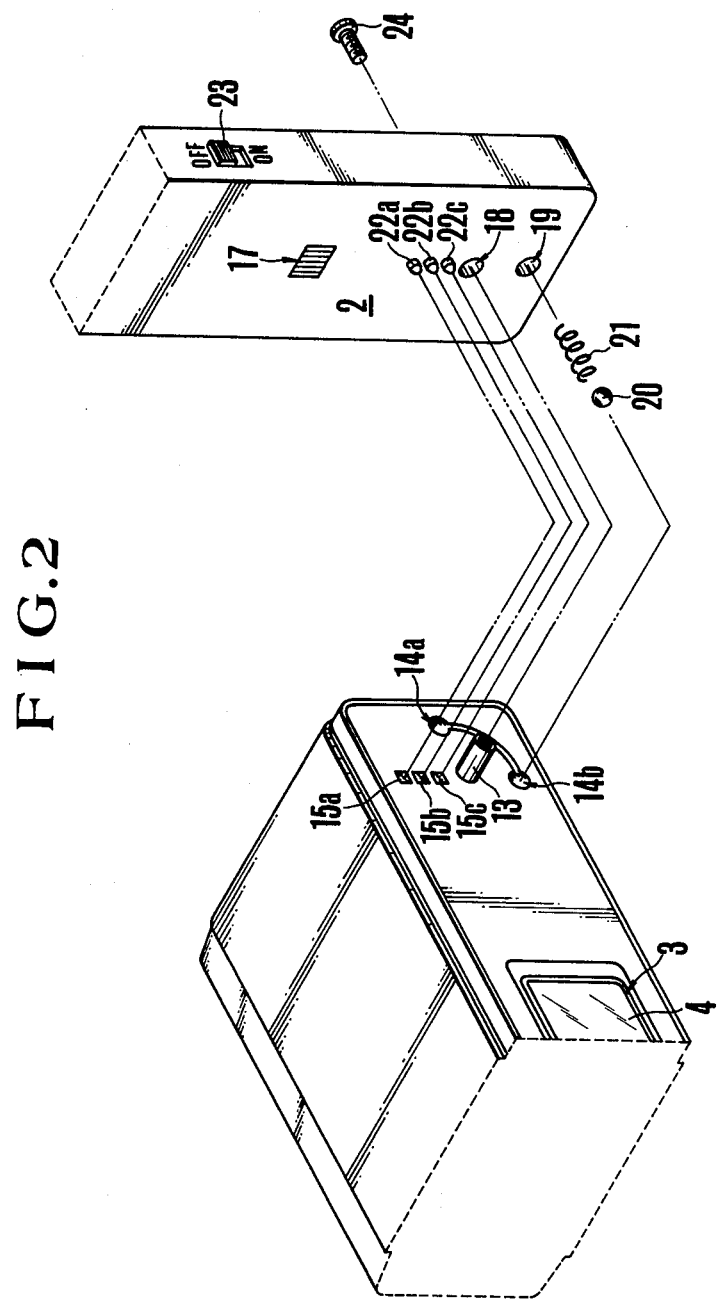

In FIGS. 1 to 3, member 1 is a camera body. A lens cap 2 which contains a flash device is rotationally mounted at a portion of the camera body 1. Member 3 in the camera body 1 is a photographing window. A photo-taking optical system contains an objective lens 4, photographing diaphragm blades 5a and 5b, a shutter leader screen 6a and a shutter follower screen 6b.

Member 7 is a light receiving window for photo-sensing. Photo-sensing diaphragm blades 5'a and 5'b, linked with said photographing diaphragm bladed 5a, and 5b, as well as a photo-sensing element P are positioned here. Member 8 is a view finder window, and member 8a is a range finder window. Photographing window 3, light receiving window 7, view finder window 8 and range finder window 8a are all positioned at a front surface of the camera body casing, and are covered by the above mentioned lens cap 2 when the camera is not in use.

Member 9 is a diaphragm setting knob to set the diaphragm aperture defined by said diaphragm blades 5a and 5b, and member 10 is a focusing knob of a phototaking optical system. Member 11 is a release button. All three of these are provided on an upper surface of the camera body casing.

Figure 3A:
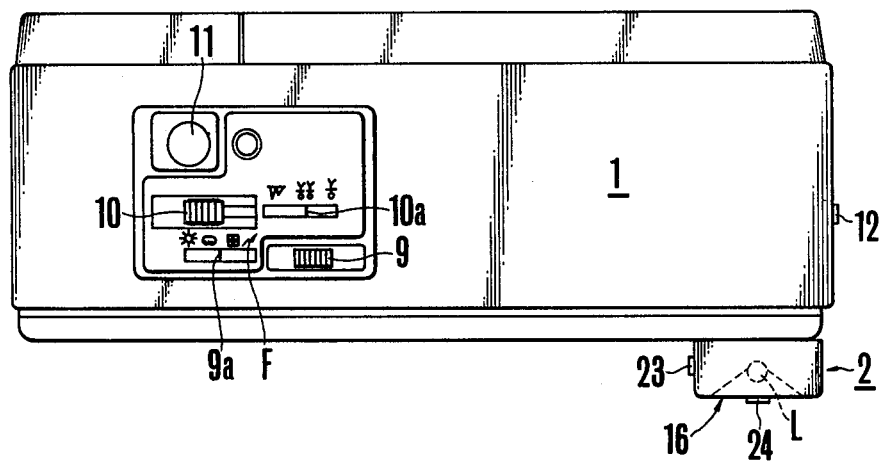
FIG. 3A is a plan view of a camera whose lens cap is brought to a raised position against a camera body.
Figure 3B:
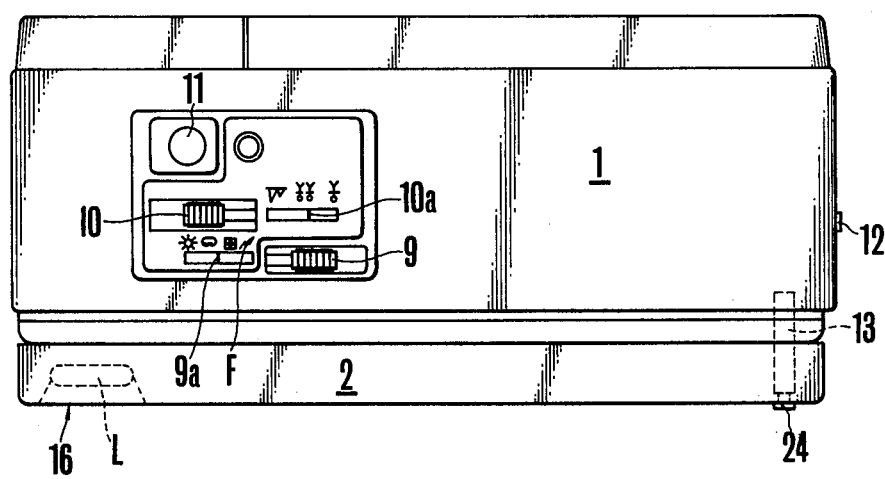
FIG. 3B is a plan view of a camera whose lens cap is closed down for covering a front surface of the camera body.

Also in FIGS. 3A, 3B, member 9a is a diaphragm aperture value pointer linked with the diaphragam setting knob 9, and 10a is a range finder pointer linked with the focusing knob 10. The system is so arranged that a flash mark F which is used only in flash photographing is provided against the diaphragm aperture value pointer 9a, and in a state wherein the diaphragm setting knob 9 is so set that the diaphragm aperture value pointer 9a matches with said mark F, shutter time is set at such prescribed value (for example 1/60 sec.) for flash photographing, as in a conventional camera of this type. Diaphragm blades 5a, 5b are set at the same time as the focusing of the taking optical system in an association with the handling of the focusing knob 10.

Member 12 is an operating knob of a power source switch is an exposure control circuit (not shown), and is provided at a side surface of the camera body casing.

In FIG. 2, member 13 is an axle member for attaching said lens cap 2 to the camera body in a rotatable manner. Members 14a and 14b are two click holes to fix the lens cap 2 at a first position (shown in FIG. 3B) wherein the cap 2 is so closed down as covering the front surface of the camera body and at a second position (shown in FIG. 1 and FIG. 3A) wherein the cap 2 is raised from the camera body. Members 15a, 15b and 15c are connection terminals to retain electrical connection between the flash device contained in the lens cap 2 and the camera body, all of which are positioned at a part of the front surface of the camera body.

In FIG. 1, member 16 is a light emission window positioned at a part of the lens cap casing, and a flash discharge tube L (shown in FIG. 4) at the flash unit, is provided at said window. Light emission window 16 is positioned near forward end part at the front surface of the lens cap casing to prevent the afore-mentioned "red eye phenomenon" which is caused when the angle formed by the segment of line connecting the flash discharge tube and an object against the optical axis of the taking lens 4 becomes small in color flash photography is done using a color film.

Further in FIG. 2, member 17 is a display window to display a light emission preparation state of the flash unit (that is a charging state of a main capacitor in the flash unit) and is positioned at a rear surface of the lens cap. A neon tube Ne (shown in FIG. 4) which displays a light emission preparation state of the flash device, which, is provided at said window.

Member 18 is an axle receiving hole to be fitted with the axle memer 13 at the camera body 1 side, member 19 is a click ball housing hole, wherein a click ball 20, which can be selectively dropped in click holes 14a and 14b positioned on the camera body 1, is housed. When said lens cap 2 is fixed to the camera body 1 as the click ball 20 is dropped in the first click hole 14a by the biasing force of spring 21 at said first position (shown in FIG. 3) said lens cap is so closed to cover the front surface of the camera body 1. Lens cap 2 is also fixed at the camera body 1 as the click ball 20 is dropped in the second click hole 14b by the biasing force of the spring 21 at said second position (shown in FIG. 1 and FIG. 3A) so as to raise it from the camera body 1. In FIG. 2, members 22a, 22b and 22c are connection terminals to be contacted with connection terminals 15a, 15b and 15c at the camera body 1 side respectively, and are provided at such position as to contact with terminals 15a, 15b, 15c only when the lens cap 2 is set at the second position, that is, the position at which cap 2 is raised from the camera body 1. Terminals 22a, 22b and 22c are so respectively biased by a conductive leaf spring, not shown as projecting outwardly.

Member 23 is an operating knob of a main switch at the flash unit and is provided at a side of the lens cap. Member 24 is a retaining screw to axially attach the lens cap 2 axle member 13, and is screwed to a forward end part of axle member 13.

Also both the camera casting and the lens cap casing are formed with light shielding material of insulating type such as plastics, etc.

Figure 4:
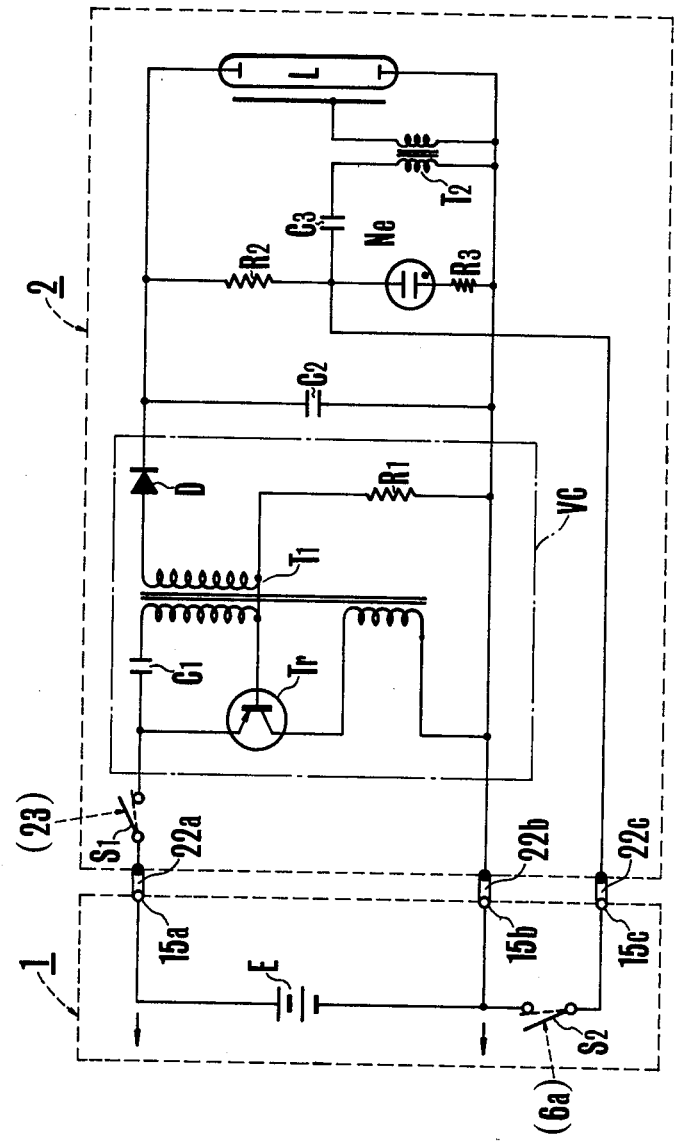

The arrangement of an electric circuit as the camera body 1 and the arrangement of an electric circuit of the flash unit housed in the lens cap 2, also on the pattern of connection between said two electric circuits is shown in FIG. 4.

In the flash unit housed in the lens cap 2, member $S_1$ is a main switch operated by the afore-mentioned operating knob 23, and VC is a booster circuit of known type consisting of a PNP type transistor Tr, an oscillation transformer $T_1$, a capacitor $C_1$, a resistor $R_1$ and rectifying diode D member $C_2$ is a main capacitor charged by high voltage supplied from the rectifying diode D to accumulate light emitting energy, while $R_2$ members and $R_3$ are resistors forming charging voltage detection circuit of main capacitor $C_2$. Ne is a neon tube to display the charging state of the main capacitor $C_2$ and is let when the voltage charged at the main capacitor $C_2$ reaches a prescribed value (that is, such a voltage level necessary for the flash discharge tube L to emit light) for displaying the completion of charging at the main capacitor $C_2$. Member $C_3$ and $T_2$ are a capacitor and a trigger transformer, respectively, forming a trigger circuit, and the secondary winding of said trigger transformer $T_2$ is connected to a trigger electrode of the flash discharge tube L.

Said main switch $S_1$ is connected to an emitter electrode of said transistor Tr at the booster circuit VC, while the connection terminals 22a and 22b are connected to the flash unit as a power source terminal of the flash unit and the connection terminal 22c is connected to the same as a trigger terminal, respectively.

Next in camera body 1, member E is a battery used as a power source for a flash unit having the afore-mentioned arrangement, and $S_2$ is a synchronizing switch of known type to be place in ON state in association with said shutter leader screen 6a when screen 6a makes the photographing aperture fully opened, and said connection terminals 15a and 15b are connected to plus side and minus side of the power source battery E, respectively, also the connection terminal 15c is connected to the synchronizing switch $S_2$.

Also, while not being shown in FIG. 4, a photo-sensing circuit of known type composed of photosensing element P and a shutter control circuit connected to said photo-sensing circuit are provided within the camera body 1. Also of course as the power source battery E for said flash unit, the power source of said photo-sensing circuit and shutter control circuit may be shared. In the drawing an arrow mark within the camera body 1 shows said manner as a general concept.

FIG. 4 also shows a manner in which the lens cap 2 is set at said positon (that is a position in which it is raised from the camera body 1), and as shown in the drawing the connection terminals 22a, 22b, and 22c are contacted to the connection terminals 15a, 15b and 15c at the camera body 1 side respectively.

In a camera having the afore-mentioned arrangement when no photography is being done, that is, when a camera is being carried, the lens cap 2 is closed down to the front surface part of the camera body 1 and at that time said lens cap 2 is fixed to the camera body 1 at said position (the above mentioned first position shown in FIG. 3B) since the click all 20 is dropped in the first click hole 14a formed at the front surface of the camera body casing by the biasing force of the spring 21.

And at this time the above mentioned photographing window 3, the light receiving window 7, the view finder window 8 and the range finder windo 8a formed at the front surface of the camera body casing will be all covered by said lens cap of light shielding type. Therefore, in this state the lens cap 1 performs a role of an ordinary lens cap.

Next, when photographing is being done, the lens cap 2 is rotated to right direction around the axle member 13 until it raises from the camera body 1 to the aforementioned second position (shown in FIG. 1, FIG. 3A). Thus each of the windows 3, 7, 8 and 8a of the camera body casing is shielded from the light When the lens cap 2 is set at second position, it is fixed to the camera body 1 at said position the click ball 20 is dropped in the second click hole 14b at the front of the camera body casing by the biasing force of the spring 21. Simultaneously each of the connection terminals 22a, 22b and 22c at the flash unit is contacted to the respective connection terminals 15a, 15b and 15c at the camera body side.

First, when ordinary daylight photographing (without flash unit) is done, the power source switch operating knob 12 of camera body casing is switched to "ON". Then the diaphragm setting knob 9 is operated to so set the same that the diaphragm aperture value pointer 9a matches with a mark other than the flash mark F shown in FIGS. 3A, 3B. By this the photographing diaphragm blades 5a, 5b and the photosensing diaphragm blades 5'a, 5'b are set. Simultaneously a photosensing circuit (not shown) actuates within the camera body 1 so that appropriate shutter time is automatically determined based on the output of the photosensing element P.

When the focusing knob 10 is operated to conduct focusing of the optical system and then the release button 11 is depressed, the shutter leader screen 6a runs. Simultaneously a shuter control circuit (not shown) actuates and the action of the shutter follower screen 6b is controlled based on the output of the photosensing circuit. This ordinary daylight photographing can be done.

For conducting flash photographing, the main switch operation knob 23 for the flash unit positioned on the lens cap 2 switches to "ON" and at the same time the diaphragm setting knob 9 of the camera body 1 is so set that the diaphragm aperture value pointer 9a matches with the flash mark F.

By this, a prescribed shutter time value suited for flash photography is set at the shutter control circuit and the photographing diaphragm blades 5a, 5b is associated with the focusing knob 10. Thus the focusing of the optical system is done by operating the focusing knob 10. At the same time the diaphragm blades 5a, 5b are set within the camera body according to the distance from an object.

Meanwhile, in the flash unit contained in the lens cap 2, since the main switch $S_1$ is closed by the switching of the operating knob 23, the flash unit is connected to the power source battery E contained in the camera body 1, thereby the charging of the main capacitor $C_2$ and the trigger capacitor $C_3$ is started through the booster circuit VC.

When the voltage charged at the main capacitor $C_2$ reaches a voltage level sufficient for the flash discharge tube L to emit light, the neon tube Ne is lighted, and the display window 17 positioned on the lens cap casing shows that the flash unit has completed preparation for light emittance.

When the release button 11 is depressed in this state, shutter leader screen 6a runs and the photographing aperture opens by screens 6a. At this time the synchronizing switch $S_2$ raises closed and the electric charge which has been accumulated at the trigger capacitor $C_3$ is discharge. Thus the discharge tube L triggers through the trigger transformer $T_2$, within the flash unit. When trigger signal is impressed on the discharge tube L by the trigger circuit, the electric charge which has been accumulated at the main capacitor $C_2$ discharges through the discharge tube L. Thus light is emitted an object is illuminated by flash light discharged from the light emission window 16 on the lens cap casing.

When the shutter time set by the diaphragm setting knob 9 has elapsed, the shutter follower screen 6b is made to run by the afore-mentioned shutter control circuit, and flash photographing is completed.

Next, explanations will be made on an example in which the present invention is applied to a 35-mm size still camera referring to FIGS. 5 to 7.

Figure 5:
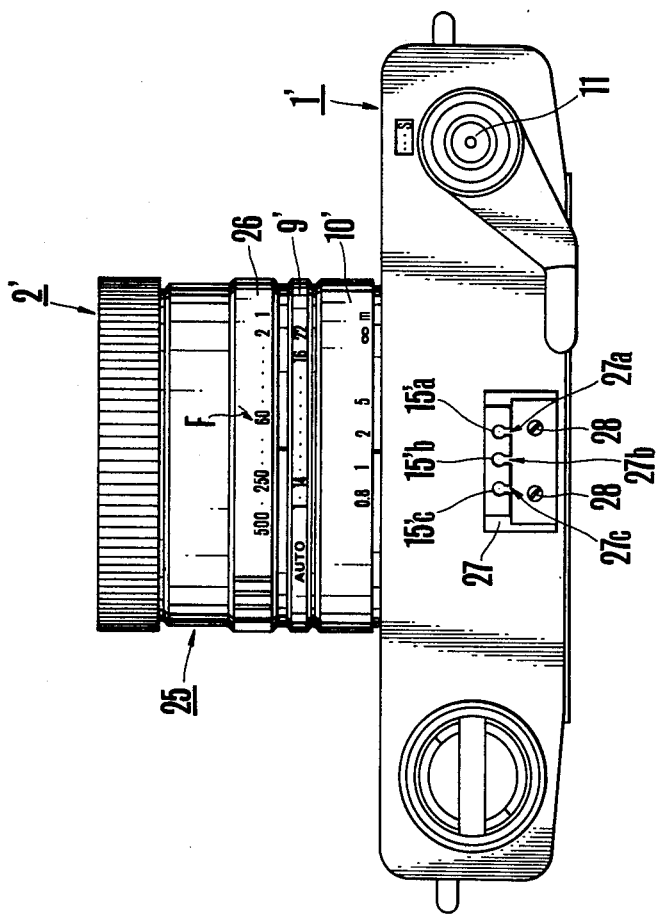
Figure 6:
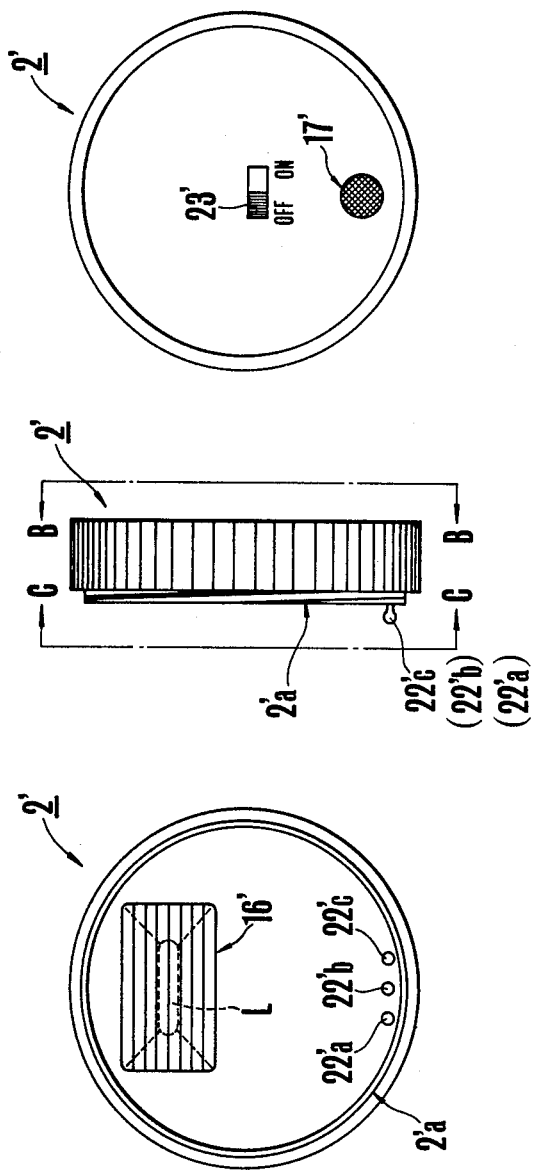
Figure 7:
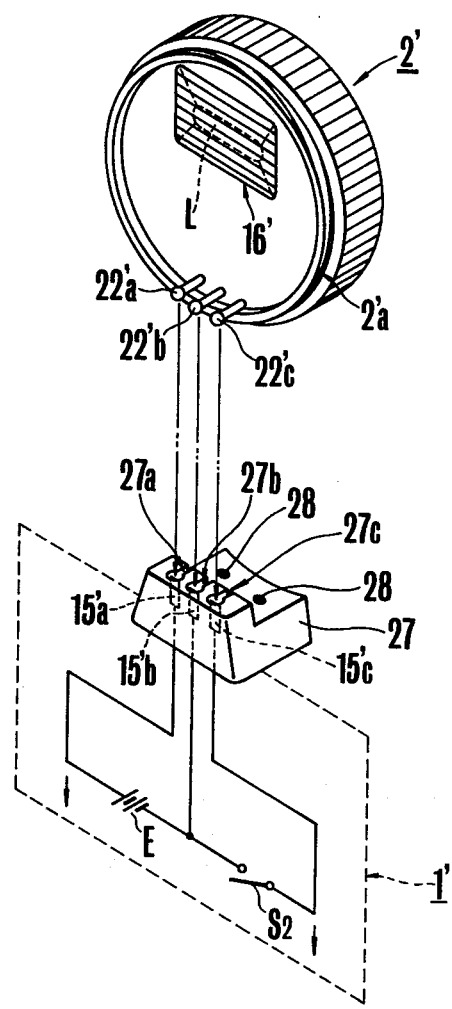

Here, the arrangement in the example shown in FIGS. 5 to 7 is basically identical to the arrangement in the example shown in FIGS. 1 to 4 except that the lens cap is made to freely attach and detach from the lens. Therefore such important components in the example shown in FIGs. 5 to 7 which are identical with those in the preceding example will be identified by same and symbols with dash (') placed thereon, and explanations on the same will be so omitted or simplfied as not hindering the understanding of this example.

First in FIG. 5 a camera body is indicated by 1', and a photo-taking lens assembly 25 consisting of an optical system (not shown), a diaphragm setting ring 9' and a focusing ring 10'. Further a shutter time setting ring 26 is provided in the camera body 1', while a lens cap 2' containing a flash unit is attached to a forward end of a lens assemby 25 to perform its original function as a lens cap.

In FIG. 7 an accessory shoe 17 made of insulating type material for mounting of the lens cap 2' is assembled to an upper part of the casing of the camera body 1' by screw 28. Three holes 27a, 27b and 27c are positioned on said shoe 27 to fix the lens cap 2', wherein connection terminals 15'a, 15'b and 15'c corresponding to the connection terminals 15a to 15c of the preceding example are positioned as conductive leaf springs and buried at said three holes 27a to 27c.

Camera body 1' is so made that all shutter times including the shutter time suitable to flash photographing (flash mark F) are selected by a shutter time setting ring 26.

Especially in flash photography such diaphragm aperture value as corresponding to a distance from an object is based on the computation of so-called "guide number" and photographing is done by manually setting diaphragm aperture value by the diaphragm setting ring 9'.

Next, as shown in detail in FIGS. 6A to 6C, 7, said lens cap 2' has a display window 17' and an operating knob 23' corresponding to the display window 17 and the main switch operating knob 23 in the preceding example respectively formed at a front surface (refer to FIG. 6B) of its casing, and a light emission window 16' and connection terminals 22'a, 22'b and 22'c corresponding to the light emission window 16 and the connection terminals 22a, 22b, and 22c in the preceding example respectively at its rear surface (refer to FIG. 6C).

And especially said connection terminals 22'a to 22'c are formed as conductive pin members which can be fitted in the above mentioned three holes 27a to 27c in said accessory shoe 27 respectively to fixedly secure the lens cap 2' at the accessory shoe 27 at the camera body 1' side, and are fixedly assembled to the rear surface of the lens caps casing.

Also what is shown as 2'a is a threaded portion used to mount the lens cap 2' to the lens assembly 25, and is threaded with a forward end part of said lens assembly 25 as the lens cap 2' is mounted to the lens assembly 25.

In a camera having said set up, first when photographing is not done that is when a camera is carried, the lens cap 2' is mounted to a forward end part of the photographing lens assembly 25 by the threaded portion 2'a thereof, and is used for protection and light shielding of the photographing lens assembly 25 being same as in an ordinary lens cap.

Next when flash photographing is done, the lens cap 2' is removed from the lens assembly 25 and is mounted to the accessory shoe 27 formed on an upper part of the camera body 1' having the connection terminals 22'a to 22'c fitted with the three holes 27a to 27c of said shoe 27, respectively.

At this time the lens cap 2' is fixedly secured to said shoe by fitting of the connection terminals 22'a to 22'c with the holes 27a to 27c of the shoe 27, and the flash device contained in the lens cap 2' will be electrically connected to the power source E and the synchronizing switch $S_2$ contained in the camera body 1' by the contact between the connection terminals 22'a to 22'c and the connection terminals 15'a to 15'c.

In this state after the main switch operating knob 23' in the lens cap 2' is changed over to "ON", the shutter time setting ring 26 at the lens assembly 25 is set at its flash mark F thereby selecting such shutter time as suited to flash photographing, further after focusing is done by the focusing ring 10', an appropriate diaphragm aperture value is computed based on a distance to an object, and the diaphragm setting ring 9' is set corresponding to said computed diaphragm aperture value for conducting flash photographing. Also detailed function in flash photographing is exactly same as in the case of the preceding example.

As has been explained above the present invention is so made that the flash device is contained in a lens cap as an indispensable accessory for a camera, and in such unique pattern of a flash device, such inconvenient situation which could usually take place can be prevented that a camera user forgets to carry a flash device and is compelled to give up a desire for flash photographing, and flash photographing can be conducted at any time necessary thus it is very convenient for a camera user.

Also such disadvantages are completely eliminated that the camera body becomes to have large size and the design of various mechanisms and devices housed in a camera body in compact manner needs to be changed as has been seen in a conventional camera in which a flash device is directely housed in a camera body.

Further, since a lens cap performs a function as a flash device together with its original function as a lens cap, the practical value of a lens cap is enhanced, and especially by providing a light emission window to have a flash discharge tube mounted therein in a flash device near an end part of a lens cap, the distance between a taking lens and a discharge tube can be made large, thus an angle formed by a segment of line connecting the discharge tube and an object against the optical axis of the taking lens can be made large, therefore so-called "red eye phenomenon" in flash photographing can be effectively prevented.

What is claimed is:

1. A photographic camera comprising:
   (A) a box-shaped light-tight camera housing having a flat frontal surface provided with a first opening for exposing film and a second opening for view finding;
   (B) a shutter device disposed behind said first opening within said housing;
   (C) a synchronous signal generating means, within said housing for generating a synchronous signal with operation of said shutter device;
   (D) connector means within said housing for receiving and electrically connecting an electrical power source;
   (E) a first terminal means disposed on a portion of said frontal surface of the housing and electrically connected with said synchronous signal generating means and said connector means;
   (F) a box-shaped shielding means for shielding said first and second openings of the frontal surface of the camera housing, said shielding means having a flat rear surface corresponding to said frontal surface of the camera housing and a frontal surface facing an object to be photographed and attached to the camera housing and movable within a plane substantially parallel to the frontal surface of the camera housing between a first and second openings of the frontal surface of the camera housing by said rear surface and a second position at which the shielding means exposes the first and second openings; said frontal surface of the shielding means being provided with a third opening and said rear surface of the shielding means being provided with a fourth opening;
   (G) a releasable fixing means for selectively fixing said shielding means against the camera housing at said first and second positions respectively;
   (H) a flash device for emitting a flash with the electrical power supplied from said electrical power source and in response to the synchronous signal generated by said synchronous signal generating means, said flash device being disposed within said shielding means and comprising:

(H-1) a flash lamp disposed within the shielding means at a position corresponding to said third opening of the frontal surface so as to emit the flash light to the object through the third opening; and (H-2) indication means for indicating the state of preparation of the flash device for flash light emission, said indication means being disposed within the shielding means at a position corresponding to said fourth opening of the rear surface so that the indicating of the indication means is observable from the outside of the shielding means;

(I) second terminal means for electrically connecting said flash device with said electrical power source and said synchronous signal generating means, said second terminal means being disposed on a portion of the rear surface of the shielding means at such a position as to be contacted with said first terminal means when the shielding means is set to said second position; and (J) manually operable switch means for controlling the electrical power supply to the flash device from said electrical power source, said switch means being inserted and connected between said second terminal means and the flash device and operable manually from the outside of the shielding means.

2. A photographic camera according to claim 1, further comprising:

means for attaching said shielding means to a portion of said frontal surface of the camera housing in such a manner that the shielding means is rotatable between said first and second positions relative to the camera housing.

3. A photographic camera according to claim 1, in which said frontal surface of the camera housing is further provided with a fifth opening shielded with said first and second openings by said shielding means when the shielding means is set to said first position;

said camera further including:

a photometric means for measuring the brightness of said objects, said photometric means being disposed behind said fifth opening within the camera housing.

4. A photographic camera according to claim 3, in which said photometric means is arranged to operate from the electrical power supplied from said electrical power source.

5. A lens cap for use with a camera, wherein said camera has:

an objective lens;
an electrical power source;
a shutter device;
a synchronizing signal generation means to generate a synchronizing signal related to operation of said shutter device;
an accessory shoe for mounting, said lens cap for flash photography; and
a first terminal means electrically connected to said electrical power source and said synchronizing signal generation means, said first terminal means being retained by said accessory shoe;

said lens cap comprising:

(A) a casing used for protection of the lens, said casing being constructed to be attached to and detached from the lens and said accessory show;

(B) a flash device for emitting light when energized by the electrical energy supplied from the electrical power source at the first terminal means and in response to the synchronizing signal generated by said synchronizing signal generation means, said flash device being housed within said casing; and (C) second terminal means for electrically connecting said flash device to said electrical power source and said synchronizing signal generation means, said second terminal means being electrically connected to said flash device and being positioned on the casing so as to electrically contact said first terminal means when said casing is mounted on said accessory shoe.

6. A lens cap according to claim 5, in which said flash device comprises:

capacitor means to accumulate electrical energy for light emission by the electrical energy supplied from said electrical power source in the camera, said capacitor means being electrically connected to said second terminal means and being electrically connected to said electrical power source through said first and second terminal means when said casing is mounted on said accessory shoe;

light emission means to emit flash light with the energy accumulated at said capacitor means, said light emission means being electrically connected to said capacitor means; and trigger means to trigger said light emission means in response to said sunchronizing signal generated at said synchronizing signal generation means, said trigger means being electrically connected to said light emission means and said second terminal means and being electrically connected to said synchronizing signal generation means through said first and second terminal means when said casing is mounted on said accessory shoe;

and said casing including a light emission window for irradiating flash light generated by said light emission means to the outside of the casing, said light emission means being positioned within the casing in line with said light emission window.

7. A lens cap according to claim 6, in which said flash device further comprises indication means to indicate an accumulation state of the energy for light emission at said capacity means, said indication means being electrically connected to said capacitor means; and said casing including an indication window to explose the indication state of said indication means, said indication means being positioned within the casing in registration with said indication window.

8. A lens cap according to claim 7, in which said flash device further comprises switch means to cut the electrical connection between said capacitor means and said second terminal means, said switch means being inserted and connected between said capacitor means and said second terminal means, and said lens cap further comprises an operating means to switch said switch means, said operable means being manually operable outside said lens cap.

* * * * *